6961X
J. Richards.
Elevated Railway
Patented Mar. 9, 1832.
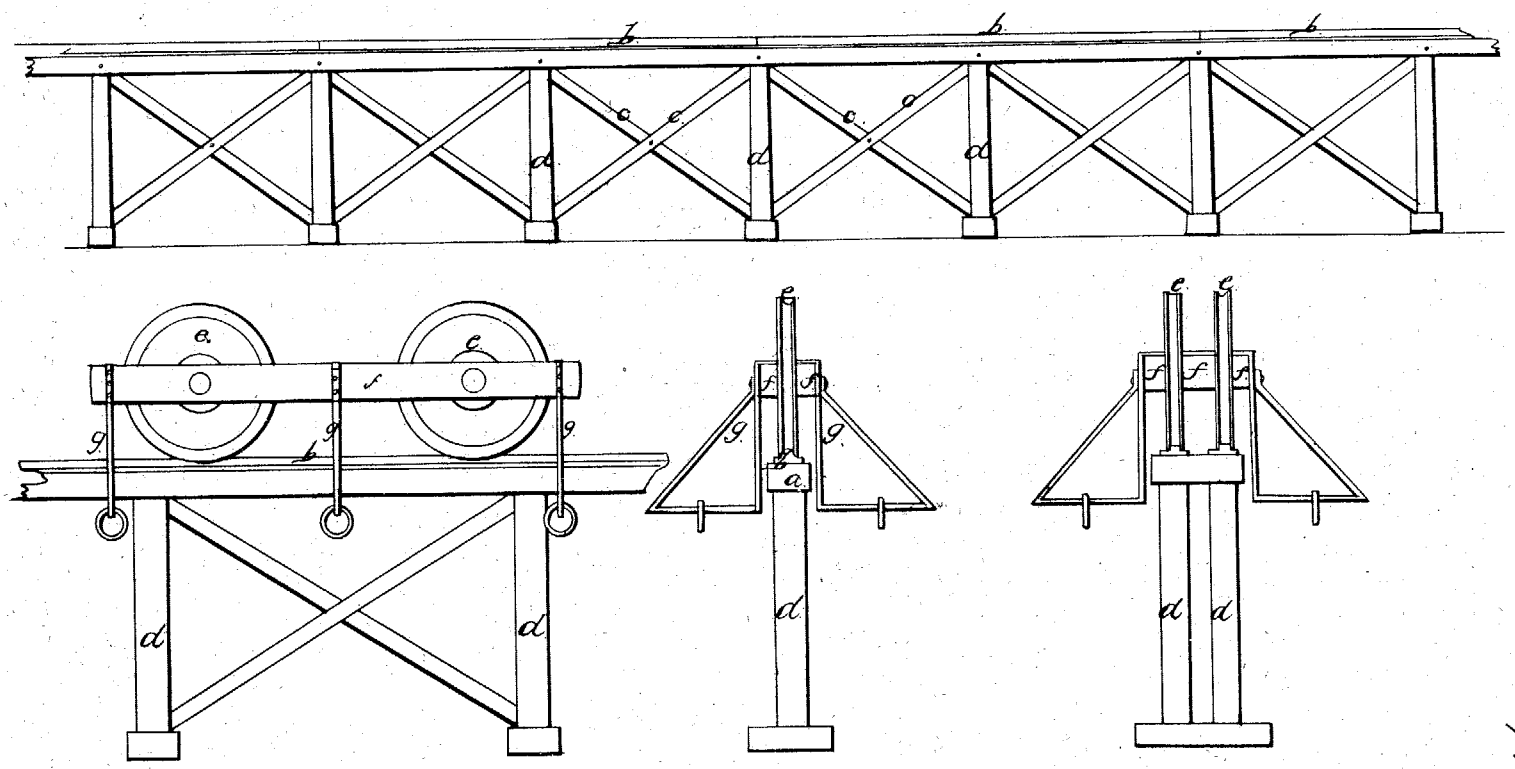
THE GRAPHIC CO. PHOTO-LITH. 39 & 41 PARK PLACE, N.Y.

6961X March 9. 1832 [illegible]

Jedediah Richards Elbridge New York

Letters Patent

The schedule referred to in these Letters Patent and making part of the
same containing a description in the words of the said Jedediah Richards
himself of his improvement in Rail ways and in the cars or carriages
used thereon.

To be it known that I Jedediah Richards of
Elbridge in the County of Onondaga and State of New York have made an improve
ment in Rail ways and in the Cars or Carriages used thereon — which is
described as follows. — The Rail way consists of one Rail supported
by post [illegible] or uprights placed at convenient distances apart and braced
by diagonal braces extending from the sole to the top pieces or bars which sup
port the Rail and which is made to project over on one side of the supports
so as to allow the weight suspended below to hang in the centre. An iron rib
or bar is secured on the top of the wooden rail before mentioned; on which
the wheels of the car run or turn. — The Car is made as follows. The wheels
are about two feet in diameter made of cast iron or any suitable material.
In the rim or out edge of these wheels is cast or turned a groove to receive and
work on the iron ribs on the Rails before mentioned. These wheels are
connected together by a perch or bar. in this bar are placed two braces to re
ceive the gudgeons of the wheels one on each side and for this purpose slots or
openings are cut at the ends of the perch in which the Braces are put and in
which Axles turn. The weight to be removed or carried is suspended from
iron rods attached to the perch or bar of the wheels and bent at right angles
below the Rail so as to clear it. Sufficient length is given to the bent arm
to place a ring in the centre in a line with the wheels of the bar to which
the weight is suspended. the arm is then bent up towards the Rail forming
a triangle. Operation. The body or weight to be moved is suspended
to the iron Rods by the rings in the centre below the Rail. The car is then
moved along the Rail. This Rail way may be made with two rails in
this case there must be double posts or bents with braces &c. the cars forgo
[illegible]

[illegible]

6961 Mar 9, 1832

[illegible] on each side sufficiently far to let the load pass the sills being [illegible]
by [illegible] for the purpose. This rail way and car is calculated to unload
vessels and remove heavy weights, also for travelling. When used for this purpo[illegible]
the carriage is to be fitted up for accommodating any convenient number of
passengers and suspended below the wheels and rail

What I claim as my invention and desire to secure by Letters Patent
is the before described improvement in Rail ways and in the cars or
Carriages used thereon. For further illustration of my invention I
refer to the model and drawing of the same deposited in the Patent Office
In testimony whereof I have hereunto subscribed my name this 7th day
of March 1832

Witnesses
William H Elliot
Saml P Walker

Jedediah Richards (600 words)